United States Patent
Ma et al.

(10) Patent No.: US 7,068,606 B1
(45) Date of Patent: Jun. 27, 2006

(54) OVERLOAD CONTROL METHOD FOR A PACKET-SWITCHED NETWORK

(75) Inventors: Jian Ma, Beijing (CN); Peng Zhang, Beijing (CN)

(73) Assignee: Nokia Corporation, Espoo (FI)

( * ) Notice: Subject to any disclaimer, the term of this patent is extended or adjusted under 35 U.S.C. 154(b) by 951 days.

(21) Appl. No.: 09/954,363

(22) Filed: Sep. 17, 2001

Related U.S. Application Data

(63) Continuation of application No. PCT/EP99/01891, filed on Mar. 18, 1999.

(51) Int. Cl.
*H04L 12/26* (2006.01)

(52) U.S. Cl. ...................................... 370/236
(58) Field of Classification Search ................ 370/229, 370/230.1, 235, 236, 236.1, 236.2, 395.4, 370/395.41, 428, 429
See application file for complete search history.

(56) References Cited

U.S. PATENT DOCUMENTS

| | | | | |
|---|---|---|---|---|
| 4,380,063 A | * | 4/1983 | Janson et al. | 370/235 |
| 5,815,667 A | * | 9/1998 | Chien et al. | 709/232 |
| 6,038,216 A | * | 3/2000 | Packer | 370/231 |
| 6,119,235 A | * | 9/2000 | Vaid et al. | 713/201 |
| 6,163,540 A | * | 12/2000 | Cheung et al. | 370/394 |
| 6,167,027 A | * | 12/2000 | Aubert et al. | 370/230 |
| 6,178,174 B1 | * | 1/2001 | Franke et al. | 370/429 |
| 6,745,361 B1 | * | 6/2004 | Gradischnig | 714/749 |

FOREIGN PATENT DOCUMENTS

| | | |
|---|---|---|
| EP | 0697778 | 2/1996 |
| WO | WO 98/20511 | 5/1998 |

OTHER PUBLICATIONS

"Improving TCP Performance in ATM Network by the Fast TCP Flow Control," International Conference on Communication Technology, ICCT '98, Oct. 22-24, 1999, Beijing China, pp. S46-07-1 through S46-07-5.

* cited by examiner

*Primary Examiner*—Kwang Bin Yao
(74) *Attorney, Agent, or Firm*—Squire, Sanders & Dempsey L.L.P.

(57) ABSTRACT

The invention relates to a method for controlling overload in a packet-switched network, especially in a network where the Transmission Control Protocol (TCP) is used as the transport layer protocol. In order to inform the traffic source at a very early stage that the network is getting overloaded or congested, the transmission of acknowledgments traveling towards the source is only allowed if enough tokens are available. A token-based mechanism calculates the number of tokens on the basis of resource conditions such as a spare forward buffer capacity in a network node. Thereby, a threshold for a buffer occupancy or a rate for delaying the acknowledgments do not have to be determined. The acknowledgments are constrained closely related to the current network resource and not to the characterization of the data traffic. As a result, the overload control is significantly robust.

16 Claims, 2 Drawing Sheets

OVERLOAD CONTROL METHOD FOR A PACKET-SWITCHED NETWORK

This application is a continuation of international application serial number PCT/EP99/01891, filed 18 Mar. 1999.

FIELD OF THE INVENTION

The present invention relates to a method for controlling overload in a packet-switched network, especially a network in which the Transmission Control Protocol (TCP) is used as a transport layer protocol.

BACKGROUND OF THE INVENTION

As commonly known, TCP is the most popular transport layer protocol for data transfer. It provides connection-oriented reliable transfer of data between two communicating hosts, wherein a host refers to a network-connected computer, or to any system which can be connected to a network for offering services to another host connected to the same network. TCP uses several techniques to maximize the performance of the connection by monitoring different variables relating to the connection. For example, TCP includes an internal algorithm for avoiding congestion.

ATM (Asynchronous Transfer Mode), in turn, is a connection-oriented packet-switching technique which the internal telecommunication standardization organization ITU-T has chosen as the target solution of a broadband Integrated Services Digital Network (B-ISDN). The problems of conventional packet networks have been eliminated in the ATM network by using short packets of a standard length (53 bytes), known as cells. ATM networks are quickly being adopted as backbones for the various parts of TCP/IP networks such as the Internet.

Although ATM has been designed to provide an end-to-end transport level service, it is very likely that, also in the future, networks will be implemented in such a way that TCP/IP remains the de-facto standard of the networks and only a part of the end-to-end path of a connection is implemented using ATM. Thus, even though ATM will continue to be utilized, TCP will still be needed to provide the end-to-end transport functions.

The introduction of ATM also means that implementations must be able to support the huge legacy of existing data applications, in which TCP is widely used as transport layer protocol. To migrate the existing upper layer protocols to ATM networks, several approaches to congestion control in ATM networks have been considered in the past.

Congestion control relates to the general problem of traffic management for packet-switched networks. Congestion means a situation in which the number of transmission requests at a specific time exceeds the transmission capacity at a certain network point (called a bottle-neck resource). Congestion usually results in overload conditions. As a result, the buffers overflow, for instance, so that packets are retransmitted either by the network or by the subscriber. In general, congestion arises when the incoming traffic to a specific link is more than the outgoing link capacity. The primary function of congestion control is to ensure good throughput and delay performance while maintaining a fair allocation of network resources to users. For the TCP traffic, whose traffic patterns are often highly bursty, congestion control poses a challenging problem. It is known that packet losses result in a significant degradation in TCP throughput. Thus, for the best possible throughput, a minimum number of packet losses should occur.

For the above mentioned reasons, most of such networks are TCP networks or TCP over ATM networks, i.e. networks in which TCP provides the end-to-end transport function and the ATM network provides the underlying "bit pipes".

In the article "Improving TCP performance over ATM by the fast TCP flow control" by Jing Wu, Peng Zhang and Jian Ma, ICCT'98, Beijing, China, October 1998, fast-TCP (FTCP) is described, which is readily to be used in intermediate nodes aiming to improve the TCP throughput by quickly relieving congestion. The mechanisms of FTCP can be divided into three parts: congestion detection, identification of acknowledgments (ACKs) and delay of ACKs. The basic idea is to delay the acknowledgments being transferred from a destination to a source of a data packet. This can be done at the same network point where congestion has been detected, or, alternatively, a network point detecting overload or congestion can direct another network point to delay the acknowledgments. Thus, congestion control is performed on the return path of the connection. Instead of discarding packets or cells on the forward path, the network delays acknowledgments on the return path and thus causes the TCP source to reduce its output rate. A congestion detection is used to notify congestion before a buffer overflow occurs. Furthermore, an identification of data packets including ACKs is required to extract the ACK flow from the normal data traffic. The rate of ACKs is adjusted by delaying the ACKs.

In particular, a fixed threshold for the forward buffer occupancy is said, so that congestion is notified once the buffer occupancy exceeds the threshold. ACKs flows are delayed according to the congestion state, i.e. congestion or no congestion. That is, when no congestion occurs, ACKs leak by a normal rate, otherwise, by a fraction of the normal rate. The normal rate is set equal to the rate of the data packets in the forward path. If the rate is to be halved when a congestion is detected, the fraction is set to a half.

Thus, the transport protocol TCP itself does not have to be amended in any way.

However, it is difficult to set a reasonable threshold in order to meet the desired efficiency of the network resource without degrading validity of FTCP. To avoid congestion, a small threshold might be preferred so as to notify the congestion in an early state. However, in this case, the forward buffer capacity might be largely underutilized. On the contrary, if a large threshold is chosen, buffer overflow is likely to happen.

Furthermore, the termination of the delay rate of the ACKs also leads to a problem. For FTCP, the ACKs should be delayed according to the network traffic conditions. However, in real networks, traffic changes so quickly and frequently that it is difficult to provide a well-adapted delay rate.

SUMMARY OF THE INVENTION

It is therefore an object of the present invention to provide a method for controlling overload in a packet-switched network, and a packet-switched telecommunication network, which ensure a high network efficiency and a good adaptation to the network traffic conditions.

This object is achieved by a method for controlling overload in a packet-switched network comprising traffic sources, traffic destinations and networks nodes, comprising the steps of:

transmitting data units from a traffic source to a traffic destination;

transmitting acknowledgments from said traffic destination to said traffic source, if a data unit has been received correctly at said traffic destination;

calculating a token number on the basis of a resource condition in at least one network node; and allowing a transmission of said acknowledgment to said traffic source only if said calculated token number exceeds a token limit.

Additionally, the above object is achieved by a packet-switched telecommunication network comprising:

network nodes interconnected by transmission lines;

traffic sources for transmitting data packets;

traffic destinations for receiving data packets;

calculating means for calculating a token number on the basis of a resource condition in at least one of said network nodes; and enabling means for allowing a transmission of data packets carrying acknowledgments from a traffic destination to a traffic source, only if said calculated token number exceeds a token limit.

Accordingly, the threshold for the forward buffer occupancy and the delay rate of the ACKs do not have to be determined. Instead, the delay of the ACKs is closely related to the current network resource, i.e. spare buffer occupancy, and not to the characterization of the data traffic. The ACKs are delayed until enough tokens, i.e. more than the token limit, are available at the concerned network node.

Since the overload control is still a type of FTCP, it also provides the known advantages of FTCP, such as fully avoiding packet loss, shortening buffer capacity, smoothing traffic etc.

Furthermore, the calculation of the token number and the transmission allowance of the ACKs can be implemented in a very simple and easy manner based on the known FTCP systems.

Preferably, the acknowledgments are stored in a buffer of the at least one network node. Thereby, the calculation of the token number and the serving of the acknowledgments can be performed in the same network node, wherein the release of an acknowledgment from the buffer is enabled on the basis of the calculated token number.

Preferably, the token limit is a predetermined value, such as zero, and used at least as a default value. In this case, the transmission of the ACKs is allowed as soon as at least one token is available at the concerned network node. Alternatively, the token limit may be a variable value which is changed in dependence on the network conditions.

The resource condition preferably may be a spare forward buffer capacity. In this case, the token number can be calculated by dividing the spare forward buffer capacity by an average packet length. Thus, the token number is calculated on the basis of the actual resource condition at the concerned network node, since the average packet length is taken into account. However, the token number may be calculated in various other ways, even on the basis of the spare buffer capacity alone.

Preferably, the token number is decremented after an acknowledgment has been transmitted to the traffic source. Thereby, the transmission rate of the acknowledgments is reduced in case the token number is small.

BRIEF DESCRIPTION OF DRAWINGS

In the following, the present invention will be described in greater detail on the basis of a preferred embodiment with reference to the accompanying drawings, in which.

DESCRIPTION OF THE PREFERRED EMBODIMENT

Figure 1:
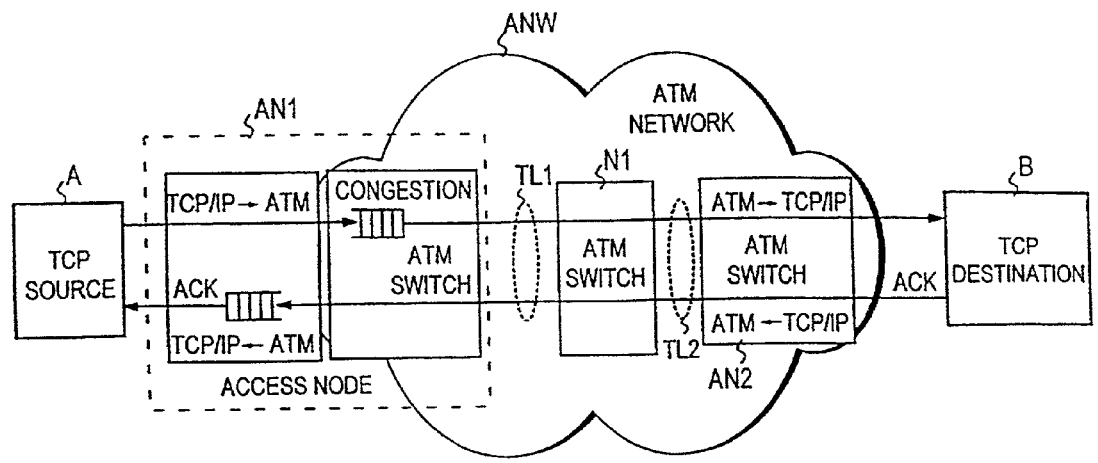
FIG. 1 shows a principal block diagram of a flow control loop in a TCP over ATM network, in which the preferred embodiment of the present invention is implemented.

In the following, the preferred embodiment of the present invention will be described on the basis of a TCP over ATM network as shown in FIG. 1.

According to FIG. 1, a connection between two user terminals A and B in a TCP over ATM network is shown, i.e. the user terminals using TCP as a transport layer protocol. In addition two access nodes AN1 and AN2 of the user terminals, one intermediate node N1 and transmission lines TL1, TL2 connecting the nodes are shown.

The TCP connection between the user terminals A and B starts with a negotiation between the user terminals A and B to open the connection. This initial negotiation is called a three-way handshake, as three opening segments are transmitted during this handshake phase. The term "segment" refers to the unit of information passed by TCP to IP (Internet Protocol). IP headers are attached to these TCP segments to form IP datagrams, i.e. TCP segments are transferred to the receiver within IP datagrams as the information units used by IP.

After the initial handshake has been completed, the user terminals A and B begin to send data by means of the TCP segments. Each uncorrupted TCP segment, including the hand-shaking segments, is acknowledged. To illustrate the basic idea of the invention, let us assume that the user terminal A transmits one TCP segment to the user terminal B. At the network layer, the user terminal A adds an IP header to this TCP segment to form an IP datagram. This datagram is converted into standard ATM cells in the access node AN1 located at the edge of the ATM network ANW. The cells of the datagram are then routed through the ATM network to the access node AN2 of the user terminal B. This access node reconstructs the original IP datagram from the arriving cells and sends the IP datagram to the user terminal B. The user terminal B removes the IP header to reveal the TCP segment. If the segment is received correctly, the user terminal B sends an acknowledging TCP segment ACK back to the user terminal A.

TCP is one of the few transport protocols that natively has a congestion control mechanism. The preferred embodiment of the present invention relies on this known TCP control mechanism, i.e. no other control mechanism is needed in the source or in the destination. Therefore, this mechanism is described briefly in the following.

TCP congestion control is based on two variables: the receiver's advertised window (Wrcvr) and the congestion window (CNWD). The receiver's advertised window is maintained at the receiver as a measure of the buffering capacity of the receiver, and the congestion window is maintained at the transmitter as a measure of the capacity of the network. The TCP source can never transmit more segments than the minimum of the receiver's advertised window and the congestion window.

The TCP congestion control method comprises two phases: slow start and congestion avoidance. A variable called SSTHRES (slow start threshold) is maintained at the source to distinguish between the two phases. The source starts to transmit in the slow start phase by sending one TCP segment, i.e. the value of CWND is set to one at the beginning. When the source receives an acknowledgment, it increments CWND by one, and, as a consequence, sends two more segments. In this way, the value of CWND doubles every round trip time during the slow start phase, as each segment is acknowledgment by the destination terminal. The slow start phase ends and the congestion avoidance phase begins when CWND reaches the value of SSTHRES.

If a packet is lost in a TCP connection, the source does not receive an acknowledgment and times out. The source sets SSTHRES to half of the CWND value when the packet was lost. More precisely, SSTHRES is said to max{2, min{CWND/2, Wrcvr}}, and CWND is set to one. As a result, the source enters the congestion avoidance phase. During the congestion avoidance phase, the source increments its CWND by 1/CWND every time a segment is acknowledged.

The IP datagrams passing through the switch in the backward direction are first routed to their correct output port. At this port, the received datagrams are stored in a FIFO-type output buffer. A traffic splitter reads the stored packets out from the output buffer one packet at a time from the first memory location of the buffer. The traffic splitter reads the acknowledgment bit of each TCP header inside each IP datagram. If this bit is valid, i.e. if the datagram includes an acknowledgment, the traffic splitter forwards the packet to an acknowledgment buffer. If the bit is not valid, the traffic splitter forwards the packet directly to the outgoing link.

Figure 2:
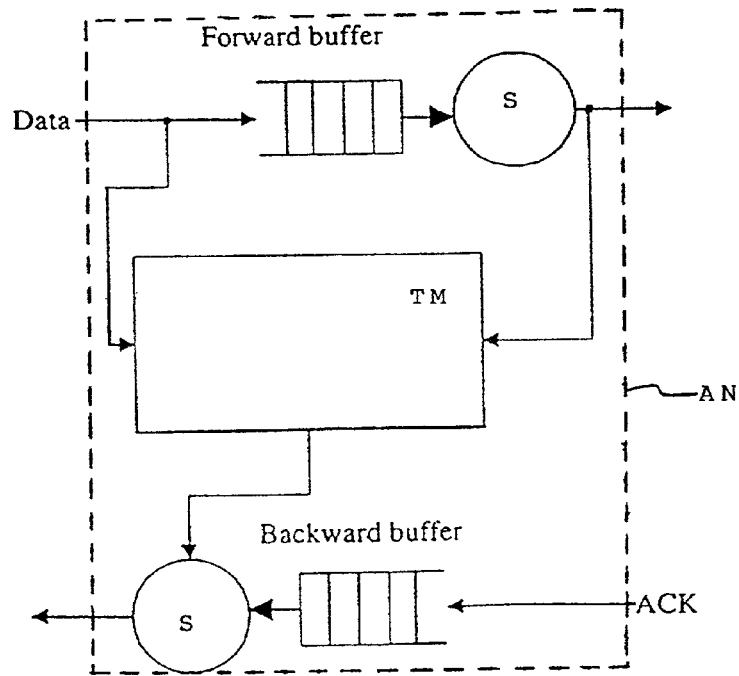
FIG. 2 shows a principal block diagram of an implementation example of a network node according to the preferred embodiment of the present invention.

FIG. 2 shows a principal block diagram of an network node such as the access node AN1 according to the preferred embodiment of the present invention. In the present embodiment, a token-based mechanism TM is provided to delay ACKs.

In the network node AN1, the token-based mechanism TM is used to control the delay of the ACKs in a backward acknowledgment buffer. In particular, ACKs are allowed to leave only if there are tokens indicating a buffer capability of the network node.

In the token-based mechanism TM, the number of tokens is calculated on the basis of a resource condition such as the spare forward buffer capacity. When data packets arrive at the network node or leave the network node, the resource condition changes and the token-based mechanism TM collects this information and calculates the number of tokens, wherein each token represents an available buffer space for a data packet having an average packet length.

It is to be noted that the forward buffer shown in FIG. 2 differs from the forward buffer shown in FIG. 1. In FIG. 1, the forward buffer of the access node AN1 is arranged in an ATM switch used for transferring ATM cells. In FIG. 2, the token-based mechanism calculates the number of tokens based on TCP/IP packets. Thus, TCP/IP packets are stored in the forward buffer shown in FIG. 2. However, IP packets may easily be identified from ATM cells by using the ATM layer user indication bit of the PTI (Payload Type Indicator) provided in the ATM cells according to the AAL5 (ATM Adaptation Layer Type 5) protocol.

As can be gathered from FIG. 2, the token-based mechanism TM obtains the required information from a data input line and an output of a server S for serving data packets stored in the forward buffer towards the TCP destination. Based on input information, the token-based mechanism TM calculates the token number and controls a backward server S for serving data packets including acknowledgments from the backward buffer to the TCP source, so as to allow a transmission of acknowledgments only if enough tokens are available.

The control of the token-based mechanism TM is based on an algorithm used for calculating the number of tokens. The calculation may be performed by a CPU using a corresponding control program stored in a memory, or preferably by a wired hardware circuit.

The algorithm for calculating the number of tokens requires the following four parameters:

token buffer capacity $B_T$
acknowledgment buffer capacity $B_A$
number of tokens $N_T$
token limit $T_L$ Furthermore, the following temporary variables are required:

average packet length $L_p$
data packet count pc

Figure 3:
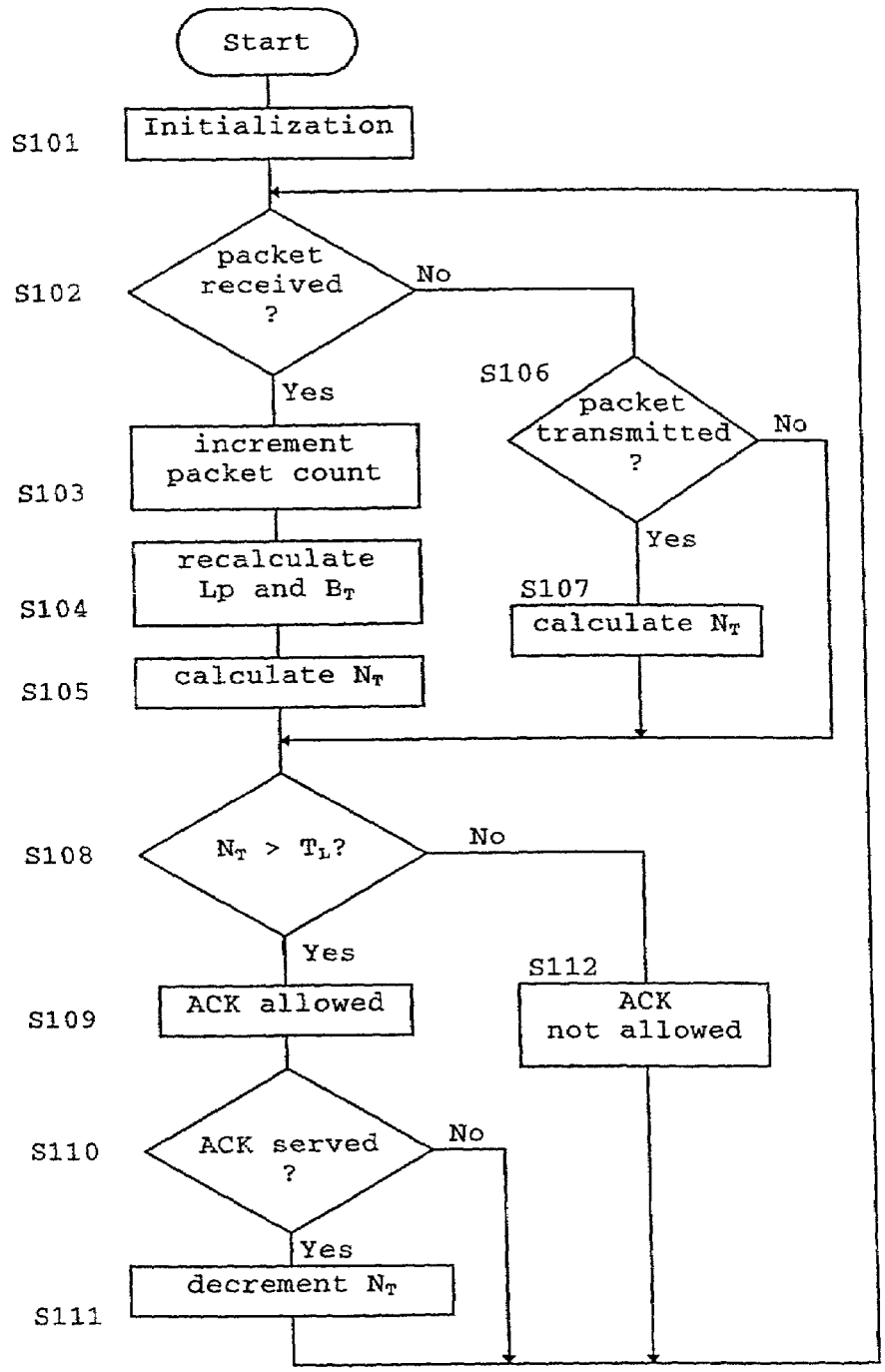
FIG. 3 shows a flow diagram of an implementation example of an overload control method according to the preferred embodiment of the present invention.

In the following, an example for the implementation of such an algorithm in FTCP is described on the basis of FIG. 3. The algorithm is started with an initialization in step S101, wherein the packet count pc is reset to zero and the token buffer capacity $B_T$ and the number of tokens $N_T$ are reset to a value obtained by dividing the forward buffer capacity by a default packet length stored in the token-based mechanism TM.

If it is then determined in step S102 that a packet has been received, i.e. has arrived at the forward buffer, the variable pc is incremented by one (S103) and the average packet length $L_p$ and the token buffer capacity $B_T$ are recalculated in step S104 based on the following equations:

$$L_p = (\text{input packet length} - L_p)/pc \qquad (1)$$

$$B_T = \text{forward buffer capacity}/Lp \qquad (2)$$

wherein the input packet length may be obtained by the token-based mechanism TM as an input information or, in case the data packets are also applied to token-based mechanism TM, maybe calculated by the token-based mechanism TM.

Alternatively, the equation (1) may be replaced by the following equation (1)':

$$L_p = r \cdot (\text{input packet length} - L_p) \qquad (1)'$$

wherein r is a constant used to decide how fast Lp is to follow a variation of the packet length. In this case, the variable pc is no longer required.

Then, in step S105 a token number $N_T$ is calculated on the basis of the following equations:

$$N_T = \text{spare forward buffer capacity}/L_p \qquad (3)$$

$$N_T = \min(B_T, N_T) \qquad (4)$$

In case no data packet has arrived, it is determined in step S106 whether a data packet has been transmitted from the forward buffer. If so, the number of tokens $N_T$ is calculated in step S107 based on the above equations (3) and (4). If no data packet has been transmitted, the operation proceeds to step S108, where the token-based mechanism TM determines whether the token number $N_T$ is greater than the token limit $T_L$, i.e. whether enough tokens are available. If so, the transmission of an acknowledgment ACK from the backward buffer (S109) is allowed, and if it is then determined in step S110 that an acknowledgment has been served, the token number $N_T$ is decremented in step S111. If no acknowledgment has been served, the number of tokens $N_T$ is maintained.

The token limit $T_L$ can be a predetermined value, e.g. zero, or a variable which is adjusted in dependence on a variation of the control delay, i.e. the propagation delay between a congestion node and the source, or other network parameters. In the latter case, the value zero can be used as a default value.

In case it is determined in step S108 that the number of tokens $N_T$ is not greater than $T_L$, i.e. enough tokens are not available, the transmission of an acknowledgment ACK is not allowed in step S112, such that the acknowledgments are delayed until enough tokens are available. The same applies in case the backward acknowledgment buffer capacity $B_A$ is not large enough to avoid any loss of acknowledgments. This may be checked by also comparing the above mentioned parameter $B_A$ with a threshold value.

It is to be noted, that the backward data buffer for those data packets which do not include an acknowledgment is not shown in FIG. 2. Furthermore, any other function of the TCP may be included in the present embodiment. In particular, the flow of acknowledgments is to be extracted from the data flow in advance, before performing the token-based control.

The token-based overload control method maybe utilized in any packet network. This means that the network comprises user terminals, network access points providing access to the network, and switches. The user terminals act as traffic sources and destinations, i.e. as points for transmitting and receiving data. The switches can be packet switches or ATM switches. An access point can be, for example a router, or an access point can carry out packet assembling/reassembling, routing or switching. The delaying of the acknowledging packets is preferable carried out at the access points, but it can also be carried out in the switches arranged within the network.

According to the above description, the overload control can be performed without changing the interworking TCP protocol. In other words, the interworking of the ATM and TCP flow control loops can be implemented in an inexpensive way.

The above described method can also be used together with other flow control mechanisms. Furthermore, the delaying of acknowledgments maybe used together with a method which is similar to the above method according to the preferred embodiment but which generates duplicate acknowledgments, instead of delaying acknowledgments. By duplicating the acknowledgments, the TCP source can be made to slow down its output rate, i.e. duplication has a same kind of effect on the TCP source as delaying. This is based on the fast retransmission and fast recovery algorithms which the source automatically performs after receiving a certain number (typically three) of duplicate acknowledgments. These algorithms are widely implemented in different TCP versions. According to the algorithms, the source performs, after receiving a certain number of duplicate acknowledgments, a retransmission of what appears to be the missing segment, without waiting for a retransmission timer to expire (fast retransmission algorithm). After this, the source performs congestion avoidance, instead of slow start, in order not to reduce the data flow abruptly (fast recovery algorithm).

Although the invention has been described here in connection with the preferred embodiment shown in the attached drawings, it is clear that the invention is not limited to this examples, as it can be varied in several ways within the scope of the attached claims. As indicated above, a prerequisite for a user terminal is that it acknowledges correctly received (i.e. uncorrupted) data units. Therefore, the idea can in principal be applied to any other protocol which sends acknowledgments and slows down its output rate if the acknowledgments are delayed. The formula used for calculating the token number may also vary in many ways, as long as a token number reflecting the current resource conditions is obtained. The user terminals may also have a wireless access to the network.

In summary, the invention relates to a method for controlling overload in a packet-switched network, especially in a network where the Transmission Control Protocol (TCP) is used as a transport layer protocol. In order to inform the traffic source at a very early stage that the network is getting overloaded or congested, the transmission of acknowledgments traveling towards the source is only allowed if enough tokens are available. A token-based mechanism calculates the number of tokens on the basis of a resource condition such as a spare forward buffer capacity in a network node. Thereby, a threshold for a buffer occupancy or a rate for delaying the acknowledgments do not have to be determined. The acknowledgments are constrained closely related to the current network resource and not to the characterization of the data traffic. As a result, the overload control is significantly robust.

The invention claimed is:

1. A method for controlling overload in a packet-switched network comprising traffic sources (A), traffic destinations (B) and network nodes (ANI, AN2), comprising the steps of:
   a) transmitting data units from a traffic source to a traffic destination;
   b) transmitting an acknowledgment from said traffic destination to said traffic source, if a data unit has been received correctly at said traffic destination;
   c) calculating a token number on the basis of a resource condition in at least one network node; and
   d) allowing a transmission of said acknowledgment to said traffic source only if said calculated token number exceeds a token limit,
   wherein the token number is calculated based on a spare capacity of a forward buffer in at least one network node, the forward buffer storing the data units which have been transmitted from the traffic source.

2. A method according to claim 1, wherein said acknowledgment is stored in a buffer of said at least one network node.

3. A method according to claim 1, wherein said token limit is zero.

4. A method according to claim 1, wherein said token limit is a variable value which is changed in dependence on the network conditions.

5. A method according to claim 1, wherein said resource condition is a spare buffer capacity.

6. A method according to claim 5, wherein said a token number is calculated by dividing said spare forward buffer capacity by an average packet length.

7. A method according to claim 1, wherein said token number is decremented after an acknowledgment has been transmitted to said traffic source.

8. A packet-switched telecommunication network comprising:
 a) network nodes (AN I, AN, NI) interconnected by transmission lines (TL1, TL2);
 b) traffic sources (A) for transmitting data packets;
 c) traffic destinations (B) for receiving data packets;
 d) calculating means (TM) for calculating a token number on the basis of a resource condition in at least one of said network nodes (AN I, AN2, NI); and
 e) enabling means (TM) for allowing a transmission of data packets carrying acknowledgments from a traffic destination to a traffic source, only if said calculated token number exceeds a token limit,
 wherein the token number is calculated based on a spare capacity of a forward buffer in at least one network node, the forward buffer storing the data units which have been transmitted from the traffic source.

9. A network according to claim 8, wherein said at least one of said network nodes comprises said calculation means (TM) and said enabling means (TM).

10. A network according to claim 8, wherein said at least one of said network nodes comprises a buffer means for storing said data packets carrying acknowledgments.

11. A network according to claim 8, wherein said calculating means (TM) is arranged to calculate said token number by dividing a spare forward buffer capacity of said at least one network node by an average packet length.

12. A network according to claim 8, wherein said packet-switched telecommunication network is an IP network and said network nodes are arranged to switch IP packets.

13. A network according to claim 8, wherein said packet-switched telecommunication network is a TCP over ATM network.

14. A network node for a packet-switched telecommunication network, comprising:
 a) calculating means (TM) for calculating a token number on the basis of a resource condition in said network node; and
 b) enabling means (TM) for allowing a transmission of data packets carrying acknowledgments from a traffic destination (B) to a traffic source (A) only if said calculated token number exceeds a token limit,
 wherein the token number is calculated based on a spare capacity of a forward buffer in at least one network node, the forward buffer storing the data units which have been transmitted from the traffic source.

15. A network node according to claim 14, further comprising buffer means for storing said data packets carrying acknowledgments.

16. A network node according to claim 14, wherein said calculating means (TM) is arranged to calculate said token number by dividing a spare forward buffer capacity of said network node by an average packet length.

* * * * *